UNITED STATES PATENT OFFICE.

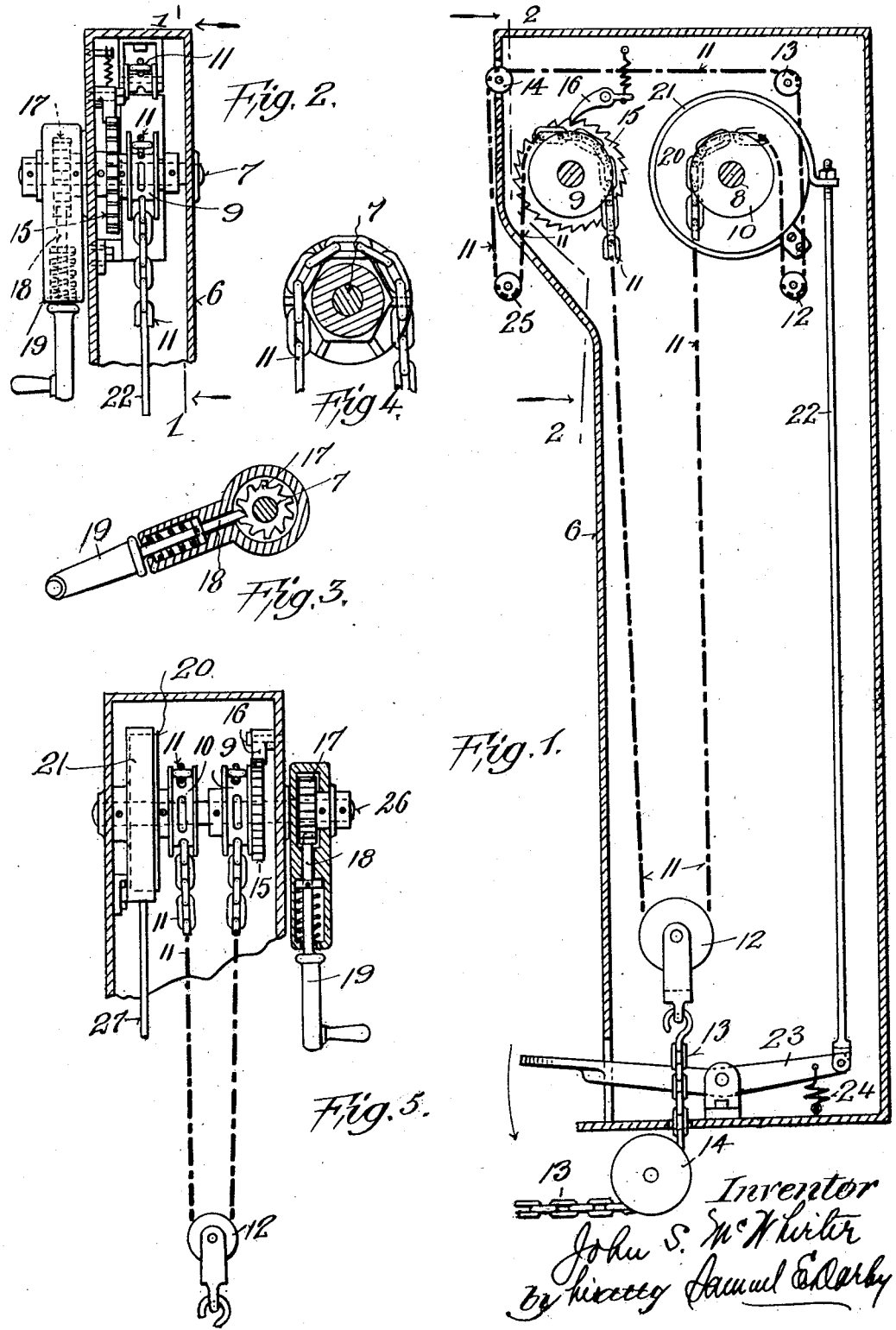

JOHN S. McWHIRTER, OF NEW YORK, N. Y.

BRAKE-OPERATING MECHANISM FOR STREET CARS AND SIMILAR VEHICLES.

1,409,226. Specification of Letters Patent. Patented Mar. 14, 1922.

Application filed May 19, 1919. Serial No. 298,202.

*To all whom it may concern:*

Be it known that I, JOHN S. McWHIRTER, a citizen of the United States, residing at New York, in the county of New York and State of New York, have made a certain new and useful Invention in Brake-Operating Mechanism for Street Cars and Similar Vehicles, of which the following is a specification.

This invention relates to brake operating mechanism for street cars and similar vehicles.

The object of the invention is to improve the construction of brake operating mechanism employed in connection with street cars and similar vehicles, and to render the same more efficient in operation.

A further object of the invention is to provide a brake operating mechanism capable of being actuated by means of a lever in place of the usual actuating wheel employed in present methods, thereby conserving space on the car platform.

A further object of the invention is to provide a brake operating mechanism in which the danger of accident or injury due to the rapid operation of the actuating lever or wheel upon release of the brakes is eliminated.

A further object of the invention is to provide a brake operating mechanism in which an operating lever may be employed without danger of accident or injury.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the accompanying drawing:

Fig. 1 is a view in vertical section on the line 1, 1, Fig. 2, looking in the direction of the arrows, showing a construction of brake operating mechanism embodying the principles of my invention.

Fig. 2 is a view in section, parts broken off, on the line 2, 2, Fig. 1, looking in the direction of the arrows.

Fig. 3 is a detached detail view in section showing an operating lever for actuating the brake operating mechanism.

Fig. 4 is a broken detail view in transverse section showing the engagement of the flexible brake operating cable to a sprocket drum.

Fig. 5 is a view similar to Fig. 1 showing a slightly modified arrangement of brake operating mechanism embodying my invention.

The same part is designated by the same reference numeral wherever it occurs throughout the several views.

In the construction of brake operating mechanism for cars or similar vehicles as heretofore employed, it has been a usual practice to employ a brake operating cable which works over a sprocket carried in the stand erected upon the platform of the car, said sprocket being actuated by means of a hand wheel through suitable gearing. One objection to this method is that the mechanism employed is more or less complicated, and by reason of the number of parts required is expensive to manufacture and to maintain. Another objection is that the employment of an operating hand wheel takes up space on the platform which might otherwise be utilized, and the use of an operating lever in place of a hand wheel has been regarded as too dangerous because of the fact that when the brakes are released the reaction or recoil is imposed on the drum over which the cable operates, which, through its gear connections with the lever operating shaft imparts rapid reverse rotations to the latter, thereby rendering such arrangement liable to injure the conductor or other person in the path thereof.

It is among the special purposes of my present invention to overcome these and other practical objections and to provide a brake operating mechanism in which an operating lever instead of a hand wheel may be employed, and wherein the recoil or reaction resulting upon release of the brakes is not transmitted to the shaft of the operating lever.

In carrying out my invention I propose to employ independent sprockets or drums over which the brake applying cable operates, one of said drums being operated by a hand lever in applying the brakes, and the other taking the strain of release of the brake applying tension reaction or recoil, whereby the effects of the release of brake tension, reaction or recoil is removed from the brake applying lever, and to permit this operation, I propose to provide suitable slack in the cable, all as will be more fully hereinafter pointed out.

Referring to the drawing, and particularly to Figs. 1, 2, 3 and 4, reference numeral 6 designates a casing or stand adapted to be erected upon the platform of a car. Mounted upon and within the casing or stand are the shafts 7, 8, upon which are respectively mounted the sprocket drums 9, 10. Over the sprocket drums 9, 10, operates the cable 11, said cable being so disposed as to form a bight in which is carried a sheave 12 which is connected through a cable 13ᵃ, the latter operating through the base of the casing, and, in practice, through the floor of the car platform and over a guide sheave 14 and connected in the usual manner to the brake mechanism (not shown). From the drum 9 the cable 11 passes over suitable guides 12, 13, 14, and thence forms into a slack loop and thence around the drum 9. Thus the cable 11 is an endless cable having portions thereof respectively operating over the drums 9, 10, and a loop thereof carrying the sheave 12 and another loop thereof constituting slack in the endless cable.

Associated with drum 9 is a ratchet disk 15 with which cooperates a spring pressed dog or pawl 16 to permit the rotation of the disk 15 and its associated sprocket drum 9 in one direction only, the pawl operating to retain the ratchet disk and drum in any position of rotative movement to which it may be actuated. Carried by the shaft 7 of drum 9 is a ratchet disk 17 engaged by a spring pressed pawl 18 mounted in an operating handle 19 whereby by rocking the handle 19 the shaft 7 and its sprocket drum 9 may be rotated in one direction only.

Associated with the sprocket drum 10 on shaft 8 is a brake drum 20 over which operates a brake strap 21 to which is connected one end of a rod or other connection 22, the other end of said connection 22 being connected to a foot lever 23 pivotally mounted in the casing 6. A tension spring 24 is connected to the foot lever 23 and exerts its tension thereon to apply the brake strap 21 to the brake drum 20.

In normal operation of the car the brake strap 21 remains applied to the drum 20, thereby holding or locking the sprocket drum 10. With the sprocket drum 10 locked the sprocket drum 9 is free for manipulation through the operating handle 19 connected thereto in the manner above described to effect an application of the brakes. During this operation it will be seen that the loop of the endless cable 11 which carries the sheave 12 becomes shortened thereby drawing in on the connection 13 to the brake mechanism. The loose portion of the endless cable resulting from this operation forms itself into the slack loop 25 in the cable. Now when it is desired to release the brake mechanism the foot lever 23 is rocked against the tension of spring 24, and in a direction to release the brake band or strap 21 in its application to the drum 20. Thereupon the reaction or recoil, due to the release of the tension on the brakes and of the springs ordinarily employed in connection with brake mechanism, is taken up in the drum 10 instead of in the drum 9, the loop slack 25 in the cable 11 permitting this action. Thus it will be seen that the drum 9 and its operating lever 19 are relieved from reverse rotations due to the reaction or recoil resulting from release of the brakes, and hence I am enabled to eliminate the danger of accident, and the use of an operating lever instead of hand wheel is thus permitted, thereby securing additional clearance space on the platform which would otherwise be occupied by the large operating hand wheel at present employed.

In Fig. 5 I have shown a slightly modified arrangement wherein the sprocket drums 9, 10, are mounted upon the same shaft 26 instead of on separate shafts 7, 8, as in the construction shown in Figs. 1 and 2. In other respects, however, the structure and operation remains the same. In the arrangement shown in Fig. 5 it will be understood, of course, that the drums 9, 10, are independent of each other, the drum 9 having the ratchet disk 15 and cooperating pawl associated therewith, while the sprocket 10 has the brake drum 20 and brake strap or band 21 associated with it. In this case the sprocket 10 and its associated drum 20 are loose on the shaft 26 while the drum 9 is fixed to said shaft.

It will be understood that various changes in the details of construction and arrangement will readily occur to persons skilled in the art and still fall within the spirit and scope of my invention. I do not desire, therefore, to be limited or restricted to the exact details shown and described.

Having now set forth the objects and nature of my invention, and a construction embodying the principles thereof, what I claim as new and useful and of my own invention, and desire to secure by Letters Patent, is,—

1. In a brake operating mechanism and in combination with brake applying connections, of operating devices therefor including an endless looped cable member for supporting one end of the brake applying connections in said loop, a pair of independently operating sprocket over which said cable operates, said sprockets being located adjacent in the same housing, means for holding one of said sprockets against rotation and means for rotating the other of said sprockets to thereby apply the brake.

2. In a brake operating mechanism for cars or other vehicles, and in combination with brake applying connections, of operating devices therefor, including an endless cable member, independent sprockets over which said cable operates, an operating member connected to one of said sprockets to rotate the same, to actuate the brake applying connections, means to lock said sprocket against reverse rotation, and releasable devices for locking the other of said sprockets.

3. In a brake operating mechanism for cars or other vehicles, and in combination with brake applying connections, of operating devices therefor, including an endless cable member, independently operating sprockets over which said cable operates, said cable being formed into a loop between said sprockets, one end of the brake applying connections being movably carried in said loop, operating devices for one of said sprockets, and normally applied releasable devices for restraining the other of said sprockets against operation.

4. In a brake operating mechanism, an endless cable arranged in a bight, means carried in the bight of said cable for applying the brakes, means for temporarily holding one leg of the cable bight stationary and to take up the other leg of the cable bight to apply the brake, and means to pay out the stationary leg of the cable bight and to temporarily hold stationary the other leg thereof to release the brakes.

5. In a brake operating mechanism, a cable arranged in a bight, drums over which the legs of said bight respectively operate, means for locking one of said drums against rotation when the brakes are applied and for releasing said drum when the brakes are released, means for rotating the other of said drums, in one direction only, and connections between said bight and the brakes.

6. In a brake operating mechanism, a cable arranged in a bight, drums over which the legs of said bight respectively operate, means to rotate one of said drums to apply the brakes, means to lock the other of said drums against rotation during the application of the brakes, and means to release said locking means to release the brakes.

7. In a brake operating mechanism, a cable arranged in a bight, drums over which the legs of said bight respectively operate, a hand lever having ratchet connection with one of said drums to rotate the same in one direction and prevent the rotation thereof in the opposite direction, and a releasable lock for the other of said drums for preventing the rotation thereof when the first drum is rotated.

8. In a brake operating mechanism, a cable arranged in a bight, drums over which the legs of said bight respectively operate, means to rotate one of said drums to apply the brakes, a brake strap to lock the other of said drums, and means to control the application and release of said strap.

9. In a brake operating mechanism, a casing, drums mounted at the top of said casing upon a common shaft, a cable formed into a bight, the legs of said bight respectively operating over said drums, an operating lever and a ratchet mechanism associated with one of said drums to rotate the same in one direction only to shorten said bight, means to lock the other of said drums, means actuated by the shortening of said bight to apply the brakes, and means to release said lock.

10. In a brake operating mechanism, a casing, drums mounted at the top of said casing, a cable formed into a bight, the legs of said bight respectively operating over said drums, an operating lever and a ratchet mechanism associated with one of said drums to rotate the same in one direction only to shorten said bight, a brake band associated with the other of said drums, means actuated by the shortening of said bight to apply the brakes, and means to apply and release said brake band.

11. In a manually controlled brake operating mechanism for cars, the combination with brake applying connections of a cable associated therewith, a sprocket for controlling said cable, manual means for rotating said sprocket for actuating said cable and said brake applying connections to apply the brakes, and means for releasing the brakes without rotation of said sprocket.

In testimony whereof I have hereunto set my hand on this 15th day of May, A. D. 1919.

JOHN S. McWHIRTER.